United States Patent
Dillinger

(10) Patent No.: US 6,921,569 B2
(45) Date of Patent: Jul. 26, 2005

(54) SOFT, DURABLE NONWOVEN NAPPED FABRIC

(75) Inventor: David A. Dillinger, Fort Mill, SC (US)

(73) Assignee: Outside the Box, Inc., Charlotte, NC (US)

(*) Notice: Subject to any disclaimer, the term of this patent is extended or adjusted under 35 U.S.C. 154(b) by 31 days.

(21) Appl. No.: 10/335,791

(22) Filed: Jan. 2, 2003

(65) Prior Publication Data

US 2004/0096620 A1 May 20, 2004

Related U.S. Application Data

(60) Provisional application No. 60/427,718, filed on Nov. 20, 2002.

(51) Int. Cl.[7] .............................. D04H 1/46; D04H 3/10; D06C 11/00; D06C 23/02
(52) U.S. Cl. ......................... 428/91; 442/408; 428/156; 428/172; 28/103; 28/104; 26/30; 26/31
(58) Field of Search ......................... 26/30, 31; 28/103, 28/104; 442/408, 409; 428/91, 196, 156, 172

(56) References Cited

U.S. PATENT DOCUMENTS 4,490,425 A * 12/1984 Knoke et al. .................. 428/90
6,200,669 B1 * 3/2001 Marmon et al. ............. 428/198

* cited by examiner

*Primary Examiner*—Cheryl A. Juska
*Assistant Examiner*—Jenna-Leigh Befumo
(74) *Attorney, Agent, or Firm*—Adams Evans P.A.

(57) ABSTRACT

A soft, durable, nonwoven fabric formed of hydroentangled synthetic polymer fibers in sheet form. The polymer fiber is surface embossed on at least one major surface with a predetermined pattern to provide a fiber sheet having enhanced dimensional stability. The fiber sheet is surface napped to soften the surface and disturb and make indistinct the surface embossed pattern. The pattern may preferably be a twill pattern, and the napping process is preferably a wire-napping process. The fabric can be constructed into blankets and numerous apparel items.

17 Claims, 5 Drawing Sheets

SOFT, DURABLE NONWOVEN NAPPED FABRIC

TECHNICAL FIELD AND BACKGROUND OF THE INVENTION

This invention relates to a soft, durable, nonwoven napped fabric, and products manufactured from such a fabric. Products that may advantageously be made from such a fabric include aircraft passenger blankets and headrest covers, moving blankets, baby blankets, stadium blankets, bed coverings, surgical drapes, and garments of all types. The fabric is both inexpensive and durable. For this reason, the fabric and products made therefrom may be disposed of after a single use, or laundered or dry-cleaned for reuse. The particular preferred embodiment of the fabric disclosed herein has particular application for use as an aircraft passenger blanket, although, as also discussed, the fabric has many other suitable uses.

Blankets are routinely furnished to airline passengers for use while sleeping or for keeping warm. Such blankets are generally knitted according to a process disclosed in U.S. Pat. No. 4,567,075. Millions of such blankets are used by the airline industry each year. Such blankets are relatively expensive and are thus often reused. Concerns have been raised regarding sanitary practices arising out of the repackaging of such blankets after use without first being laundered or dry-cleaned. Pathogens have been detected in such reused blankets, raising a concern about the environment within the aircraft and the possibility of disease and infection arising from pathogens being transmitted from one person to another with the blanket serving as the intermediary.

The fabric according to the present invention is constructed according to known hydroentangling processes. However, instead of using the fabric in its prior art form, applicant has learned through extensive research that certain nonwoven, embossed fabrics can be wire napped to create a napped nonwoven fabric that has the softness, durability and appearance of a much more expensive fabric at much lower cost. The fabric is very light weight, yet provides greater warmth than prior art blankets of similar weight.

The fabric is sufficiently inexpensive that it can be disposed of after one use. This feature enables airline operators or other users to purchase a very inexpensive blanket and dispose of the blanket after a single use. This avoids the need to send used blankets out for cleaning and repackaging. Moreover, this in turn avoids the possibility of contractors either negligently or deliberately failing to clean the blankets before packaging and returning them to the airlines for reuse, thus creating the possibility of transmitting pathogenic materials.

It has been discovered that a particular surface texture, that of a right-hand twill, when embossed onto the surface of the fabric enables the fabric to be wire napped without damage to the fabric. Rather, the twill appearance disappears and a uniformly even, napped surface is created which closely resembles more expensive woven or knitted fabrics. The fabric is very dimensionally stable, yet soft, supple and soft to the touch. Despite the fact that the surface has been napped, the fabric does not shed broken fibers or filaments, and does not pill when subjected to rubbing or abrasion.

The fabric structure is sufficiently robust that it may be embroidered with logos or initials and sewn in the same manner as woven or knitted fabrics. The fabric is free of bias, so that it may be embroidered without the need of a backing. The fabrication of blankets, for example, involves cutting the fabric to size and overedge seaming the perimeter of the sized fabric with an overedge or serge stitch. However, seaming is not necessary in all instances due to the integrity of the fabric.

The fabric may thus be constructed into garments of any suitable type, such as jackets, gloves, shirts, pants, capes, socks, scarves, soft-soled or non-soled shoes and hats. The fabric may be laminated to or overlaid with other fabric or sheet materials.

The fabric may also be constructed using conventional sonic welding or heated die-cutting techniques whereby the garment or other item is first cut to shape and then joined, or the cutting and joining takes place simultaneously.

The fabric and blanket fabricated from the blanket meets FAA regulations regarding materials ignition standards. See FAR 25.853(b).

SUMMARY OF THE INVENTION

Therefore, it is an object of the invention to provide a napped nonwoven fabric that is soft and durable.

It is another object of the invention to provide a napped nonwoven fabric that is hypoallergenic.

It is another object of the invention to provide a napped nonwoven fabric that does not pill or shed.

It is another object of the invention to provide a napped nonwoven fabric that is sufficiently inexpensive that it can either be disposed of after a single use or laundered or dry-cleaned and reused.

It is another object of the invention to provide a napped nonwoven fabric that can be fabricated into a wide variety of end use products such as blankets, bed coverings, surgical drapes and garments.

It is another object of the invention to provide a napped nonwoven fabric that is comprised of one or more synthetic fibers, such as polyester and nylon.

It is another object of the invention to provide a napped nonwoven blanket that has many of the desirable characteristics of woven or knitted fabrics at a much lower cost.

These and other objects of the present invention are achieved in the preferred embodiments disclosed below by providing a soft, durable, nonwoven fabric, comprising hydroentangled synthetic polymer fibers in sheet form. The polymer fiber is surface embossed on at least one major surface with a predetermined pattern to provide a fiber sheet having enhanced dimensional stability. The fiber sheet is surface napped to soften the surface and disturb and make indistinct the surface embossed pattern.

According to one preferred embodiment of the invention, the synthetic polymer fiber comprises polyester.

According to another preferred embodiment of the invention, the surface-embossed pattern comprises a twill pattern.

According to yet another preferred embodiment of the invention, the fabric is wire-napped.

According to yet another preferred embodiment of the invention, the fabric has a weight of between 2.4 and 3.0 oz/yd$^2$.

According to yet another preferred embodiment of the invention, the twill is a righthand twill.

According to yet another preferred embodiment of the invention, the surface of the fabric is embossed with a twill pattern, and the fabric is wire-napped to disturb the embossed pattern and provide an appearance of a woven or knitted fabric.

According to yet another preferred embodiment of the invention, the fabric meets FAA regulations regarding materials ignition standards.

According to yet another preferred embodiment of the invention, the fabric is fabricated into an item selected from the group consisting of blankets, passenger seat headrest covers, bed coverings, surgical drapes, jackets, gloves, shirts, pants, capes, socks, scarves, hats and soft-soled shoes.

An embodiment of fabricating a soft, durable, nonwoven fabric item according to the invention comprises the steps of hydroentangling synthetic polymer fibers into a sheet, surface embossing the sheet on at least one major surface with a predetermined pattern to provide a sheet having enhanced dimensional stability, and surface napping the sheet to soften the surface and disturb and make indistinct the surface embossed pattern.

According to another preferred embodiment of the invention, the step of hydroentangling the synthetic polymer fiber comprises the step of hydroentangling polyester fibers.

According to yet another preferred embodiment of the invention, the step of surface-embossing the fabric with a pattern comprises the step of embossing the fabric with a twill pattern.

According to yet another preferred embodiment of the invention, the step of napping the fabric comprises the step of wire-napping the fabric.

According to yet another preferred embodiment of the invention, the fabric has a weight of between 2.4 and 3.0 oz/yd².

According to yet another preferred embodiment of the invention, the step of surface-embossing the fabric with a pattern comprises the step of embossing the fabric with a twill pattern.

According to yet another preferred embodiment of the invention, the method includes the steps of embossing the surface of the fabric with a twill pattern, and wire-napping the fabric to disturb the embossed pattern and provide an appearance of a woven or knitted fabric.

According to yet another preferred embodiment of the invention, the method includes the step of fabricating the fabric into an item selected from the group consisting of blankets, passenger seat headrest covers, bed coverings, surgical drapes, jackets, gloves, shirts, pants, capes, socks, scarves, hats and soft-soled shoes.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
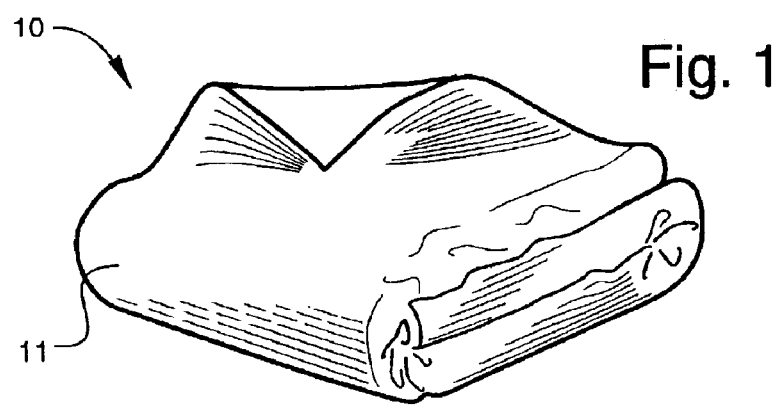
FIG. 1 is a blanket fabricated from a fabric according to an embodiment of the invention.

Referring now specifically to the drawings, a blanket according to the present invention is illustrated in FIG. 1 and shown generally at reference numeral 10. The blanket 10 is fabricated of a nonwoven fabric 11 according to the present invention. The fabric 11 is made by a known hydroentangling process, as described in several prior art patents; for example, U.S. Pat. Nos. 6,430,788 and 3,485,706. Prior art uses of such fabrics have generally been as wipes and non-napped fabrics such as used in the medical field. Such fabrics are generally embossed with a surface pattern that also imposes a further integration of the fibers on the fabric. As noted above, prior art blankets, particularly those given to aircraft passengers, are generally woven, and are subject to a number of problems.

The fabric 11 is formed of polyester fibers that are hydroentangled, then embossed with a surface pattern. Applicant has determined that a righthand twill provides the correct amount of additional dimensional stability to the fabric. The fabric 11 is then wire-napped to make the twill pattern indistinct. The result is a fabric that looks like a woven or knitted fabric with similar functional characteristics. The fabric 11 is then cut and sewn in an ordinary manner. The fabric 11 may be sewn with conventional interlock or overedge or serging stitches, as required. The fabric may be dyed according to several conventional polyester dyeing processes, for example, a jet-dyeing process.

The specifications of a preferred embodiment of the fabric according to an embodiment of the invention are set out below:

TABLE 1

Fabric Spec:    Product    Date:    Sep. 4, 2002
Style #
Fiber: 100% Polyester
Description: Coarse Twill jet dyed and napped
Physical specification:

| Property | Test Method | Units | Target | Min | Max |
|---|---|---|---|---|---|
| Basis weight | ASTM D3776 | oz/yd2 gsm | 2.7 90.5 | 2.4 81.5 | 3.0 100.0 |
| Bulk | ASTM D5729 | inches | 0.033 | — | — |
| MD Tensile | ASTM D5034 | lbs. | 45 | — | — |
| CD Tensile | ASTM D5034 | lbs. | 32 | — | — |
| MD Elongation | ASTM D5034 | % | 64 | — | — |
| CD Elongation | ASTM D5034 | % | 69 | — | — |
| MD Elmendorf Tear | ASTM D5734 | grams | 551 | — | — |

TABLE 1-continued

| | | | | | |
|---|---|---|---|---|---|
| CD Elmendorf Tear | ASTM D5734 | grams | 1616 | — | — |
| Wash Shrinkage | AATCC 135 | 3 cycles %, MD/CD | −3.0/−2.0 | — | — |
| Colorfastness to Crocking | AATCC 8 | rating, wet/dry | 5.0/5.0 | — | — |
| Colorfastness to Light | AATCC 16 | rating, 40 hrs. | 5.0 | — | — |
| Colorfastness to Washing | AATCC 61 | rating, shade/stain | 5.0/3.5 | — | — |
| Vertical Flammability | 14CFR 25.853(a) | | | — | — |
| | | Self-extinguish time | sec. | 5 | — | 15 |
| | | Burn length | inches | 5.73 | — | 8 |
| | | Extinguish time | sec. | 0 | — | 5 |

Figure 2:
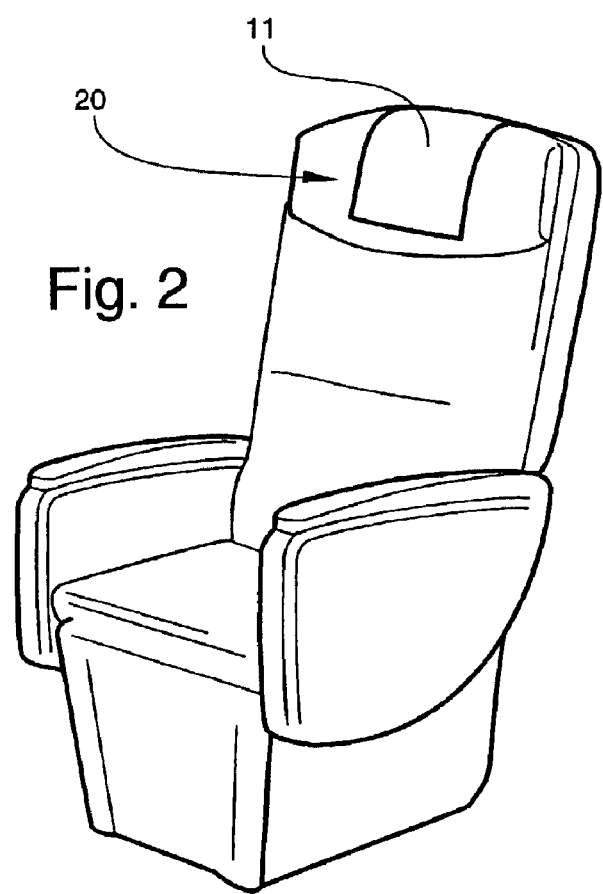
FIG. 2 is a passenger seat headrest cover fabricated from a fabric according to an embodiment of the invention.

FIG. 2 illustrates a passenger seat headrest cover 20 fabricated from the fabric 11 according to an embodiment of the invention. The fabric 11 is sufficiently inexpensive that the covers 20 can be removed and discarded after one use.

Figure 3:
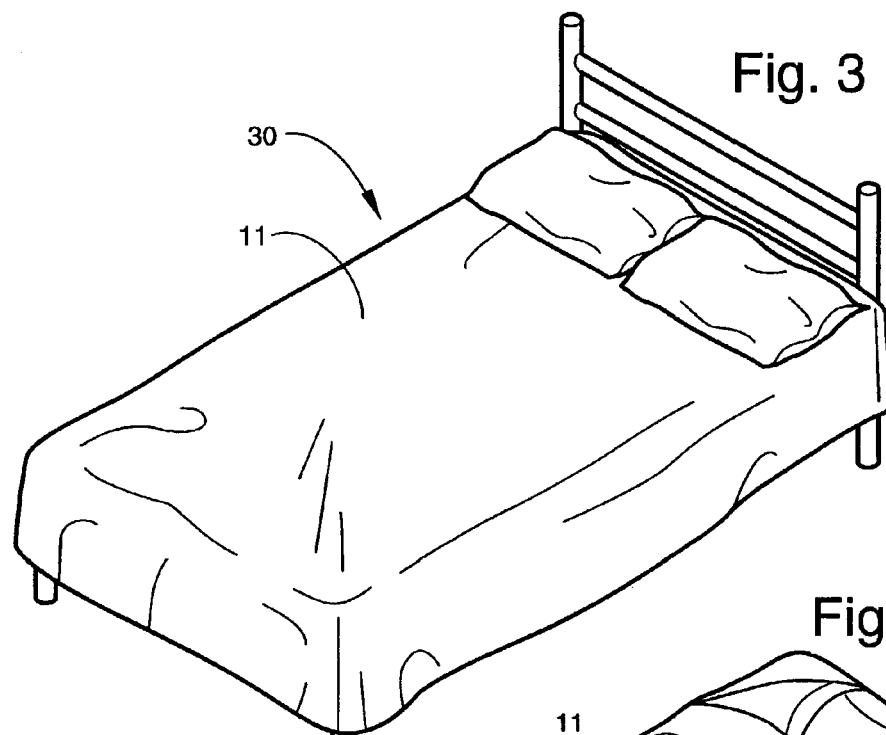
FIG. 3 is a bed covering fabricated from a fabric according to an embodiment of the invention.

FIG. 3 illustrates a bed covering 30 fabricated from the fabric 11 according to an embodiment of the invention.

Figure 4:
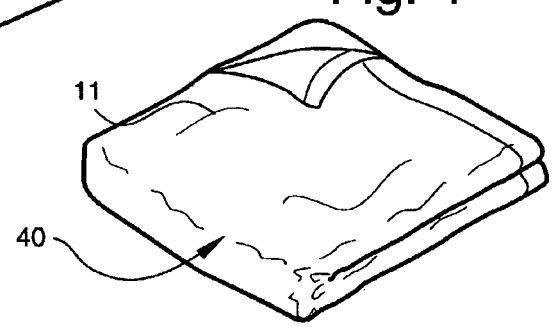
FIG. 4 is a surgical drape fabricated from a fabric according to an embodiment of the invention.

FIG. 4 illustrates a surgical drape 40 fabricated from the fabric 11 according to an embodiment of the invention. The fabric 11 is particularly well-suited for such uses as a result of its lack of shedding and pilling.

Figure 5:
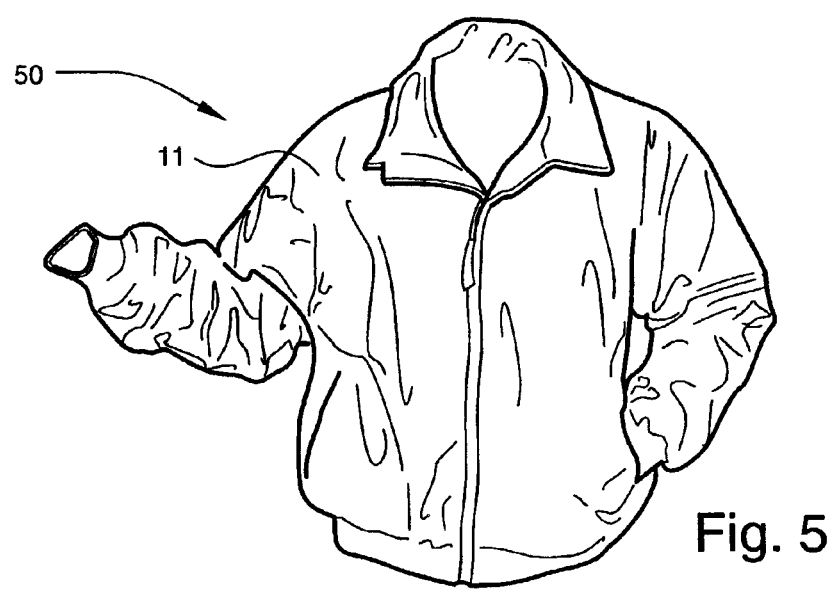
FIG. 5 is a jacket fabricated from a fabric according to an embodiment of the invention.

FIG. 5 illustrates a jacket 50 fabricated from the fabric 11 according to an embodiment of the invention. The fabric 11 cuts and sews in a similar fashion to conventional woven and knitted fabrics.

Figure 6:
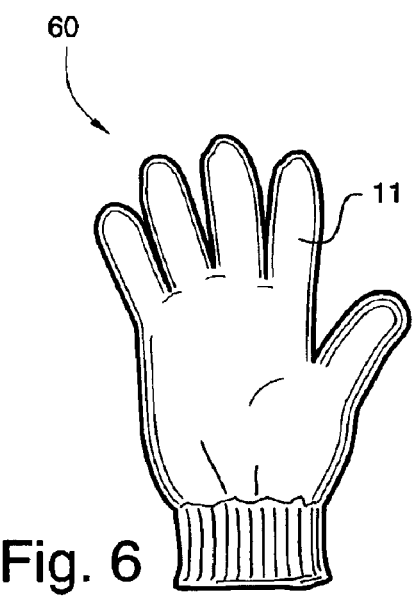
FIG. 6 is a glove fabricated from a fabric according to an embodiment of the invention.
Figure 7:
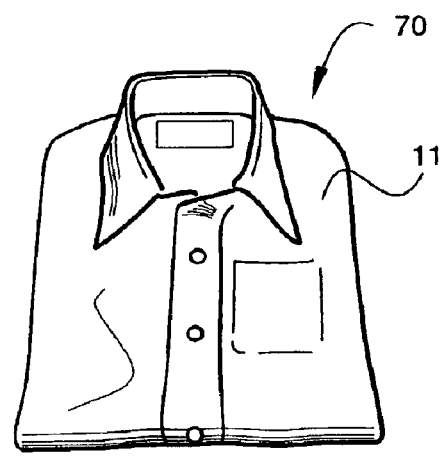
FIG. 7 is a shirt fabricated from a fabric according to an embodiment of the invention.

FIG. 6 illustrates a glove 60 fabricated from the fabric 11 according to an embodiment of the invention FIG. 7 illustrates a shirt 70 fabricated from the fabric 11 according to an embodiment of the invention.

Figure 8:
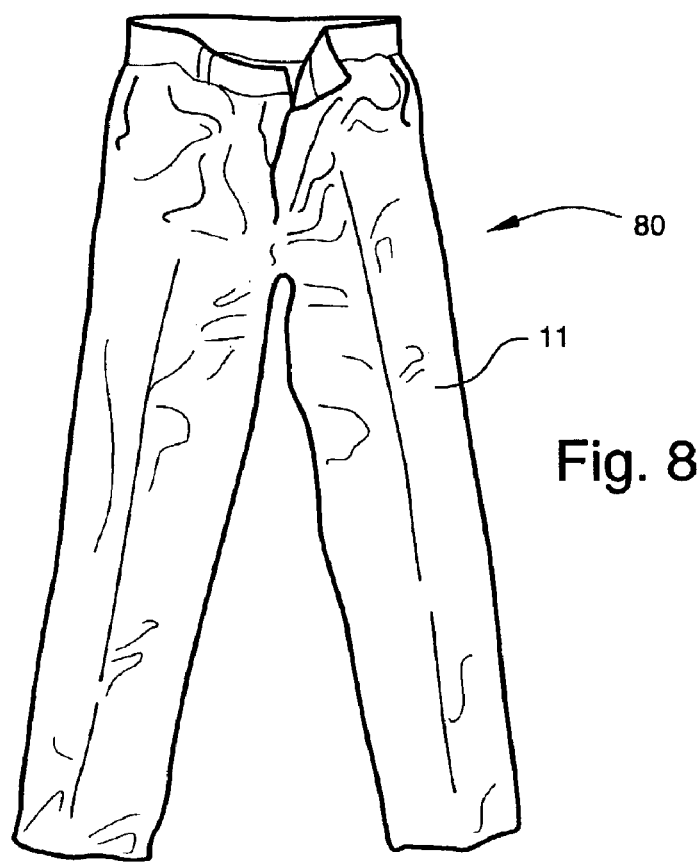
FIG. 8 is a pant fabricated from a fabric according to an embodiment of the invention.

FIG. 8 illustrates a pant 80 fabricated from the fabric 11 according to an embodiment of the invention.

Figure 9:
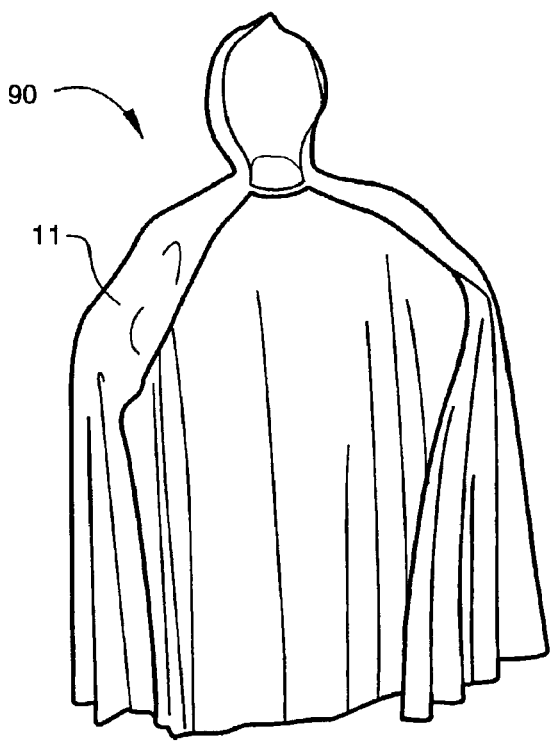
FIG. 9 is a cape fabricated from a fabric according to an embodiment of the invention.

FIG. 9 illustrates a cape 90 fabricated from the fabric 11 according to an embodiment of the invention.

Figure 10:
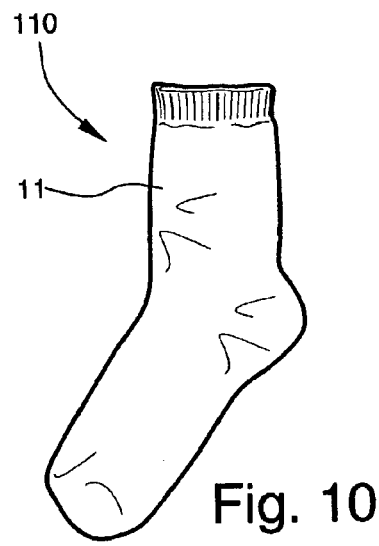
FIG. 10 is a sock fabricated from a fabric according to an embodiment of the invention.

FIG. 10 illustrates a sock 100 fabricated from the fabric 11 according to an embodiment of the invention.

Figure 11:
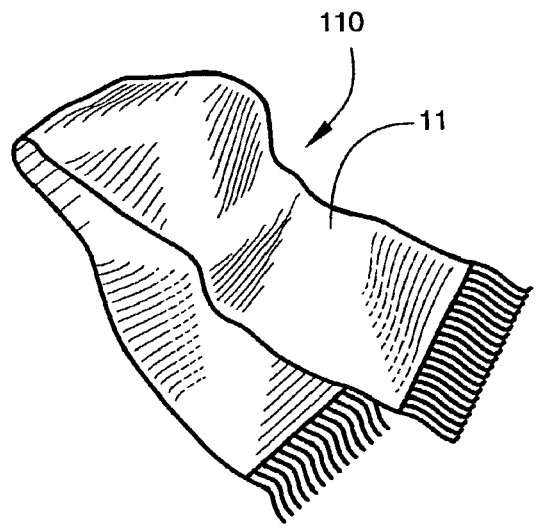
FIG. 11 is a scarf fabricated from a fabric according to an embodiment of the invention.

FIG. 11 illustrates a scarf 110 fabricated from the fabric 11 according to an embodiment of the invention.

Figure 12:
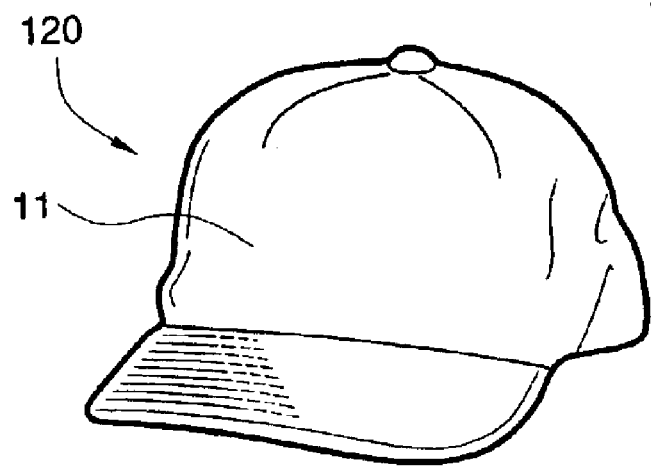
FIG. 12 is a hat fabricated from a fabric according to an embodiment of the invention.

FIG. 12 illustrates a hat 120 fabricated from the fabric 11 according to an embodiment of the invention.

Figure 13:
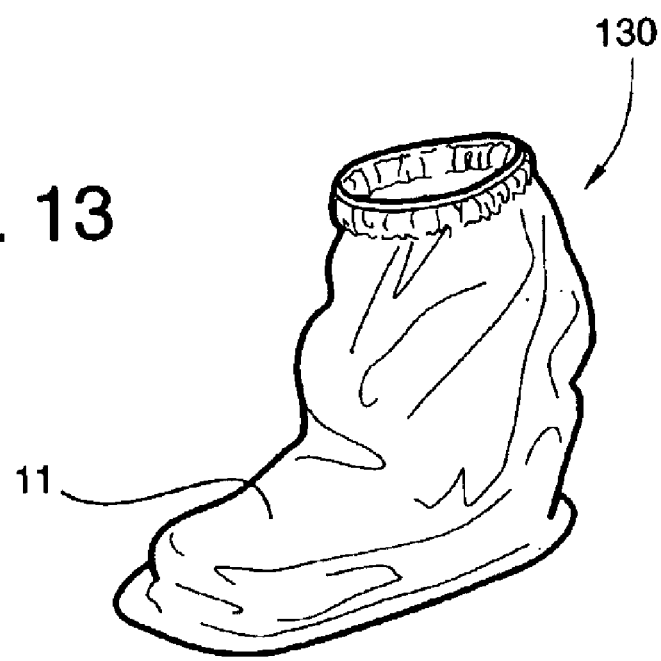
FIG. 13 is a shoe fabricated from a fabric according to an embodiment of the invention.

FIG. 13 illustrates a shoe 130 fabricated from the fabric 11 according to an embodiment of the invention.

A soft, durable nonwoven fabric and items fabricated therefrom are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A soft, durable, nonwoven fabric, comprising:
  (a) hydroentangled synthetic polymer fibers in sheet form;
  (b) said polymer fiber sheet being surface embossed on at least one major surface with a predetermined raised pattern to provide a fiber sheet having a raised, distinct embossed surface pattern having upper and lower areas, and enhanced dimensional stability, such that the embossed pattern has the appearance of a fabric; and
  (c) said fiber sheet being surface napped to soften the upper area of the raised, distinct embossed surfaces pattern and its appearance, such that the remaining pattern on the raised surface of the fiber sheet has the appearance of a woven or knitted fabric.

2. A soft, durable, nonwoven fabric according to claim 1, wherein the synthetic polymer fiber comprises polyester.

3. A soft, durable, nonwoven fabric according to claim 1, wherein the surface-embossed pattern comprises a twill pattern.

4. A soft, durable, nonwoven fabric according to claim 1, wherein the fabric is wire-napped.

5. A soft, durable, nonwoven fabric according to claim 4, wherein the fabric has a weight of between 2.7 and 3.0 oz/yd².

6. A soft, durable, nonwoven fabric according to claim 3, wherein the twill is a righthand twill.

7. A soft, durable, nonwoven fabric according to claim 1, wherein the surface of the fabric is embossed with a twill pattern, and wherein the fabric is wire-napped to disturb the embossed pattern and provide an appearance of a woven or knitted fabric.

8. A soft, durable, nonwoven fabric according to claim 1 that meets FAA regulations regarding materials ignition standards.

9. A soft, durable, nonwoven fabric according to claim 1, 2, 3, 4, 5, 6,7 or 8, wherein the fabric is fabricated into an item selected from the group consisting of blankets, passenger seat headrest covers, bed coverings, surgical drapes, jackets, gloves, shirts, pants, capes, socks, scarves, hats and soft-soled shoes.

10. A method of fabricating a soft, durable, nonwoven fabric item, comprising the steps of:
  (a) hydroentangling synthetic polymer fibers into a sheet
  (b) surface embossing the sheet on at least one major surface with a predetermined raised pattern to provide a sheet having a raised, distinct embossed surface having upper and lower areas, and enhanced dimensional stability, such that the embossed pattern has the appearance of a fabric; and
  (c) surface napping the sheet to soften the upper area of the raised, distinct embossed surface pattern and its appearance, such that the remaining pattern on the raised surface of the fiber sheet has the appearance of a woven or knitted fabric.

11. A method according to according to claim 10, wherein the step of hydroentangling the synthetic polymer fiber comprises the step of hydroentangling polyester fibers.

12. A method according to according to claim 10, wherein the step of surface-embossing the fabric with a pattern comprises the step of embossing the fabric with a twill pattern.

13. A method according to according to claim 10, wherein the step of napping the fabric comprises the step of wire-napping the fabric.

14. A method according to according to claim 13, wherein the fabric has a weight of between 2.4 and 3.0 oz/yd².

15. A method according to according to claim 13, wherein the step of surface-embossing the fabric with a pattern comprises the step of embossing the fabric with a twill pattern.

16. A method according to according to claim 10, and including the steps at:
  (a) embossing the surface of the fabric with a twill pattern; and
  (b) wire-napping the fabric to disturb the embossed pattern and provide an appearance of a woven or knitted fabric.

17. A method according to according to claims 10, 11, 12, 13, 14, 15, 16 and including the step of fabricating the fabric into an item selected from the group consisting of blankets, passenger seat headrest covers, bed coverings, surgical drapes, jackets, gloves, shirts, pants, capes, socks, scarves, hats and soft-soled shoes.

* * * * *